US011914631B2

(12) United States Patent
Acharya

(10) Patent No.: US 11,914,631 B2
(45) Date of Patent: Feb. 27, 2024

(54) SYSTEMS AND METHODS FOR USING AN ONTOLOGY TO GENERATE DATABASE ENTRIES AND ACCESS AND SEARCH A DATABASE

(71) Applicant: Allen Institute, Seattle, WA (US)

(72) Inventor: Gautham Bhat Acharya, Seattle, WA (US)

(73) Assignee: Allen Institute, Seattle, WA (US)

( * ) Notice: Subject to any disclaimer, the term of this patent is extended or adjusted under 35 U.S.C. 154(b) by 138 days.

(21) Appl. No.: 17/617,514

(22) PCT Filed: Jul. 15, 2020

(86) PCT No.: PCT/US2020/042186
§ 371 (c)(1),
(2) Date: Dec. 8, 2021

(87) PCT Pub. No.: WO2021/011691
PCT Pub. Date: Jan. 21, 2021

(65) Prior Publication Data
US 2022/0253474 A1      Aug. 11, 2022

Related U.S. Application Data

(60) Provisional application No. 62/874,839, filed on Jul. 16, 2019.

(51) Int. Cl.
*G06F 16/36* (2019.01)
*G06F 16/25* (2019.01)
(Continued)

(52) U.S. Cl.
CPC ........ *G06F 16/367* (2019.01); *G06F 16/2438* (2019.01); *G06F 16/258* (2019.01); *G06F 16/9024* (2019.01)

(58) Field of Classification Search
CPC .. G06F 16/367; G06F 16/258; G06F 16/2438; G06F 16/9024
(Continued)

(56) References Cited

U.S. PATENT DOCUMENTS 7,693,900 B2 * 4/2010 Wilmering ............ G06F 16/367
707/713
8,674,993 B1 * 3/2014 Fleming ................. G06Q 40/06
707/794
(Continued)

OTHER PUBLICATIONS

HERAULT; "semantic-graphql"; Github; Mar. 30, 2019; (online) [retrieved Sep. 2, 2020]; <URL: http://github.com/dherault/semantic-graphql>; pp. 1-11; (2019).
(Continued)

*Primary Examiner* — Shahid A Alam
(74) *Attorney, Agent, or Firm* — FisherBroyles LLP; Alan D. Minsk

(57) ABSTRACT

A system, apparatus and methods for generating database entries and tools for accessing and searching a database from an Ontology. Starting with an Ontology used to represent data and relationships between data, the system and methods described enable that data to be stored in a desired type of database and accessed using an API and search query generated from the Ontology. Embodiments provide a structure and process to implement a data access system or framework that can be used to unify and better understand information across an organization's entire set of data. Such a framework can help enable and improve the organization and discovery of knowledge, increase the value of existing data, and reduce complexity when developing next-generation applications.

19 Claims, 9 Drawing Sheets

(51) Int. Cl.
*G06F 16/242* (2019.01)
*G06F 16/901* (2019.01)

(58) Field of Classification Search
USPC .......................................................... 707/794
See application file for complete search history.

(56) References Cited

U.S. PATENT DOCUMENTS

| | | | |
|---|---|---|---|
| 10,324,964 B2* | 6/2019 | Damodaran | G06F 16/332 |
| 10,901,973 B1* | 1/2021 | Senra | G06F 16/258 |
| 2003/0172368 A1* | 9/2003 | Alumbaugh | G06F 8/71 |
| | | | 717/106 |
| 2008/0077598 A1 | 3/2008 | Wilmering et al. | |
| 2012/0179644 A1* | 7/2012 | Miranker | G06F 16/9024 |
| | | | 707/812 |
| 2016/0188698 A1 | 6/2016 | Vogel et al. | |
| 2019/0310840 A1* | 10/2019 | Dufresne | G06N 5/00 |

OTHER PUBLICATIONS

International Searching Authority; Notification of Transmittal of International Search Report and the Written Opinion of the International Searching Authority dated Sep. 30, 2020; PCT Application No. PCT/US20/42186; pp. 1-3 (2020).

* cited by examiner

SYSTEMS AND METHODS FOR USING AN ONTOLOGY TO GENERATE DATABASE ENTRIES AND ACCESS AND SEARCH A DATABASE

CROSS REFERENCE TO RELATED APPLICATION

This application claims the benefit of U.S. Provisional Application No. 62/874,839, entitled "System and Methods for Generating, Accessing and Searching a Database Using a Data Ontology," filed Jul. 16, 2019, the disclosure of which is incorporated, in its entirety (including the Appendix), by this reference.

BACKGROUND

Data in its various forms is essential to making intelligent and informed decisions. Such data may be in the form of measurements of a system or system component, a parameter or characterization of a system or system component, or metadata (a set of data that describes and gives information about other data). Several distinct types of metadata exist, among these are descriptive metadata, structural metadata, administrative metadata, reference metadata and statistical metadata. As more and more data are collected, measured, and generated, it typically becomes more difficult to efficiently organize, access and productively use that data.

Data is typically stored in a database, where each type of database has its own schema (the form of data representation) and search or query format. Further, each type of database may, by its structure and schema, provide certain benefits in terms of accessing and using the data stored in the database. This may create an incentive for users to select a specific type of database for storing their data in order to obtain the advantages or benefits of that database for their intended use of the data. As a result, users may decide to store data in different databases, depending on their needs and expectations of how the data will be used. This can make accessing and productively using data even more difficult, as data stored in different formats or types of databases may require different query formats or other tools specific to a particular database in order to effectively access and use the data.

In some cases, the same set of data may be stored in more than one database. This may be done to provide more efficient access to multiple users or to obtain benefits from certain aspects of the database, such as those related to searching for or processing data. As more data is generated and added to databases, organizing and discovering data (and the information or knowledge it represents) becomes more difficult and also a potential obstacle to solving important scientific and policy problems.

Conventional approaches to providing access to data stored in multiple databases are generally labor intensive and inefficient as the amount of data increases. Further, as the amount of data increases, an Ontology or other organizing method becomes more complex, which creates difficulties in scaling any approach used to provide search and data access capabilities.

Systems and methods are needed for more efficiently providing access to data stored in one or more databases as the amount of data increases and a data Ontology becomes more complex. Embodiments of the invention are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

As noted, it is important that users of data be able to efficiently access data stored in multiple databases and platforms. In some cases, the data may be represented in different formats and may be organized using certain tools. One such tool is an Ontology, which provides a set of concepts and categories in a subject area or domain and includes information about their properties and the relationships between data relevant to that domain. Ontologies are often created from data sets to efficiently represent relations between data and present those relationships in a format that is easier to understand. This can be very beneficial in that an Ontology can be used to represent complex data and, in many cases, can be modified or extended more easily than other forms of representing data. This makes an Ontology a natural and more efficient way of representing research or other data.

Ontologies are used in many areas of research or investigation and may contain data relevant to many different domains. However, while very useful, Ontologies do not naturally lend themselves to being searched or for the efficient retrieval of specific information or data.

As will be described herein, in some embodiments, an Ontology may be used to generate code or instructions for the purpose of generating, accessing and/or searching a database. In some embodiments, the system and methods described herein may be used to access and search databases having different schemas and search query formats.

Among other benefits, embodiments provide users and consumers of data with a structure and process to implement a data access system or framework that can be used to unify and better understand information across an organization's entire set of data and also better manage the data life cycle. Such a framework can help enable and improve the organization and discovery of knowledge, increase the value of existing data, and reduce complexity when developing next-generation applications.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
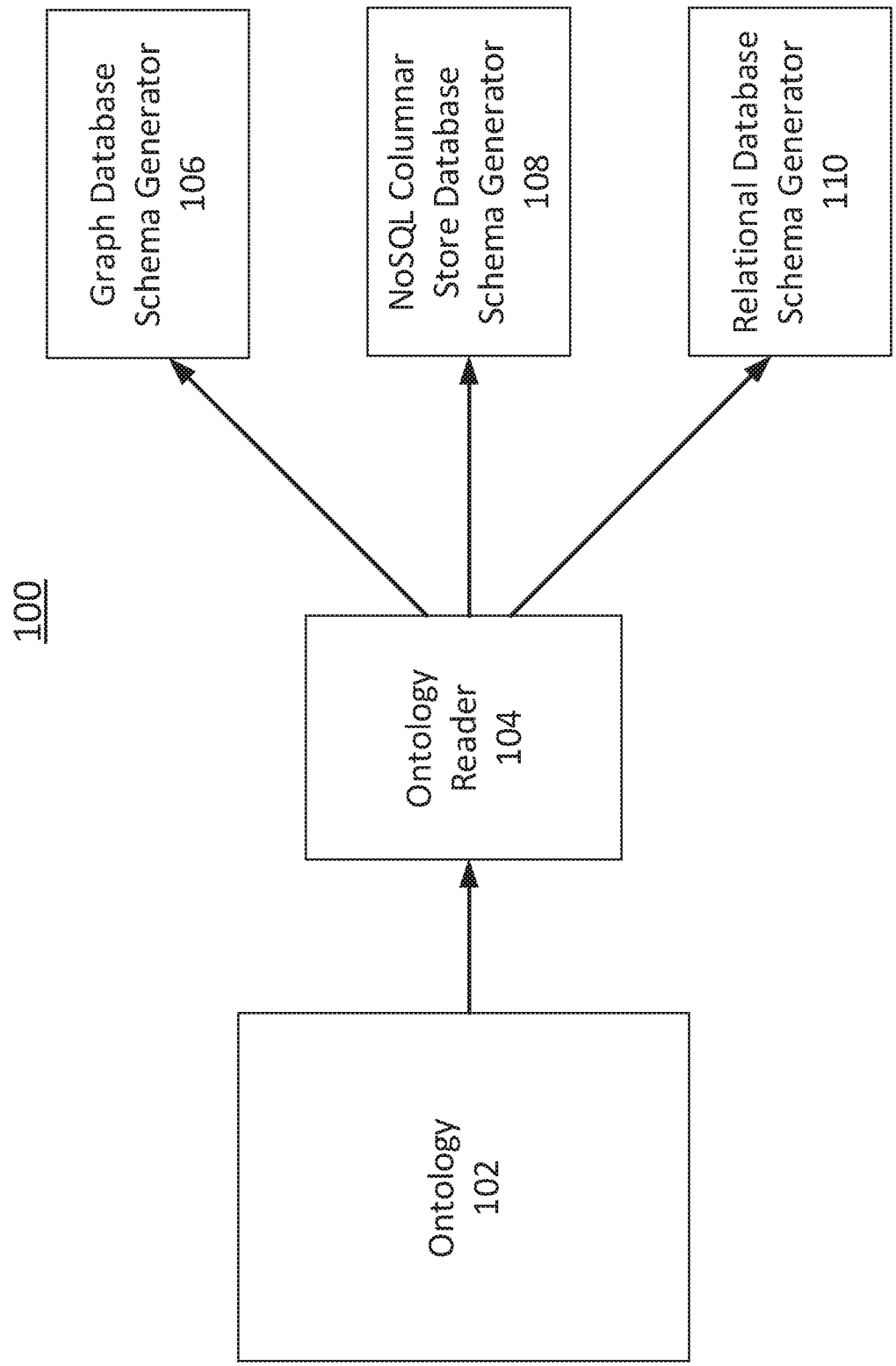
FIG. 1 is a diagram illustrating an example of a system for generating database schema based on an Ontology, with an Ontology Reader module or function being used to provide inputs for schema generators for Graph, Columnar, and Relational databases, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosed systems and methods may be practiced. The disclosed systems and methods may, however, be embodied in different forms and should not be construed as limited to the embodiments set forth herein; rather, these embodiments are provided so that this disclosure will satisfy the statutory requirements and convey the scope of the disclosed invention(s) to those skilled in the art.

Among other things, the embodiments of the disclosure may be implemented in whole or in part as a system or systems, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

As noted, it is important that users of data be able to efficiently access data stored in multiple types of databases and platforms. Further complicating this situation is that data may be represented in different formats and may be organized using different methods.

An Ontology is one such format or method and using the methods and techniques described herein, it has the benefit of being adaptable to many different types of data and relationships between data. This is both beneficial and more efficient; as new data is discovered, an Ontology can be updated or modified relatively easily to reflect the new data and relationships between entities, and also provides a convenient way to organize data for consumption and further processing. As will be described, re-executing the processes described herein can be used to generate new database entries for the new data automatically.

The instantiation of an Ontology may need to be stored in multiple databases, each with its own schema and pipeline. For example, the same data, as structured in an Ontology, may be stored in traditional Relational databases, Labeled Property-Graphs, RDF-Triple Stores, in-memory array databases, and more. Each database has its own data model, data-definition language (DDL), and query language. With a complex Ontology, re-writing a new database schema for each data store is both time-consuming and error prone. As an Ontology changes with a growing understanding of the scientific world, so will the database schemas. The overhead required in manually maintaining these schemas is not scalable for most realistic use cases and environments.

In some embodiments, an Ontology may be used to generate code or instructions for accessing and searching a database. In some embodiments, the systems and methods described herein may be used to access and search databases having different schemas and different search query formats. In some embodiments, this is achieved by representing information utilizing an Ontology format that satisfies a minimal set of requirements (e.g., that it be in a JSON-schema). The Ontology representation of data and relationships is then converted into a format (e.g., GraphQL) that is used to generate a set of tools for accessing a database and generating a search query for the database. For Ontologies that are not represented in a JSON format, such formats may be parsed based on their respective specifications, standards, and libraries. This may be done to create a form in which the Ontology Reader described herein (or a variation) can process the Ontology and generate the other features of the system and methods described herein.

In some embodiments, GraphQL APIs for use in retrieving data from multiple types of databases are constructed or generated from an Ontology. In some embodiments, database schemas and resolver functions to enable efficient data retrieval are also generated based on an Ontology. Further, in some embodiments, the systems and methods described herein may be used to automatically generate database entries based on an Ontology or similar data structure. The generated database can be accessed and searched using the techniques described herein. As new information is learned in a problem space, an Ontology can be updated or modified to reflect that information. The updated Ontology can then be translated into, or used to generate, updated database schemas to hold data as well as updated APIs to retrieve that data, using the methods described.

An embodiment of the system and methods described herein creates standards and rules for each database to ensure that information in an Ontology is predictably represented in a database schema. This methodology ensures that, given any JSON-Schema defined property in an Ontology, a user can reliably predict how it is stored in any given database. The generation of a database schema is performed by an element or function termed an "Ontology Reader", which masks the format of the Ontology, and returns the entities and their relationships in a standardized (or canonical) format.

In some embodiments, an Ontology Reader may include the following components, elements, or functional capabilities:

1. Conversion of an Ontology file into an in-memory representation as a form of language-specific data structure; and
2. Generation of APIs or class definitions to enable retrieval of data in the Ontology.

One benefit or advantage of some embodiments is that the use of an Ontology as a base structure or foundation for the database and database tools provides an efficient way of adding new information and of scaling the data access and processing needed by consumers of data. At least one reason for this is because an Ontology can be readily expanded, modified, or otherwise changed as new data is discovered or as previously known data is reinterpreted with regards to its relationship(s) to other data. An Ontology provides a relatively easier way for users to visualize data relationships and is a convenient way to organize data for consumption and further processing. In a typical use case, an Ontology is constructed to maintain a central source of authority for information about specific entities and their (inter)relationships. Typically, an Ontology attempts to capture the breadth of knowledge for an area or topic of interest.

In one example, this area or topic is that of biological cells. In such an example, the Ontology is cell-centric or cell-focused by design, whereby cell-centric or cell-focused is meant that the biological cell and its characteristics are the focus of the Ontology. This example of an Ontology attempts to capture and represent what is known and has been learned about individual cells; for example, this may include their provenance, their gene expression, their electrophysiological properties, and their morphologies. In one example, the Ontology may include information regarding organizations that fund individual experiments, the investigators for grants, the funding mechanisms, etc. A goal of such an Ontology is to encapsulate and represent a large amount of data and knowledge in an interconnected network of information regarding biological cells.

Note that in some implementations of an Ontology, its structure would not be expected to change in a substantial way if used to represent different sources of data or different applications of data. In such cases, the general format of the Ontology is the same regardless of the information being described, with any differences being reflected in the data model(s) themselves.

In some embodiments, an Ontology is represented and stored in a JSON-Schema format and exposed by a REST API for accessibility. Other formatting options that may be used in embodiments include the Resource-Description-Format (RDF), an open standard created by the W3C.

As will be described in greater detail, the methods and techniques herein can be used for multiple purposes related to the storage and access of data based on an Ontology. These include, but are not limited to:

Generation of database entries (and hence a database or databases) from an Ontology based on one or more database schemas;

Generation of a database schema or schemas from an Ontology;

Graph database schemas; and/or

Schemas for other databases;

The above methods enable storage of the data and information contained in an Ontology in a database or databases that can be accessed and searched using the tools and processes described herein.

Generation of database search queries from an Ontology;

This includes generation of database APIs for accessing the database created by storing the database entries described above;

Taken together, the methods and processes described herein enable the generation of database entries from an Ontology, and the access and search of a database formed from those entries. Starting with an Ontology used to represent data and relationships between data, the system and methods described enable that data to be stored in a desired type of database and accessed using an API and search query generated from the Ontology.

For example, the Integrated Data Framework system and platform described herein can be used to unify multiple sources of data into a form in which that data can be accessed by a greater number of users and more efficiently used. This can result from creating a single database that holds all data and information that an organization has generated regarding a specific topic based on the processing of multiple Ontologies, where each Ontology represented a set of data from a specific source or was used for a specific purpose.

The Integrated Data Framework can also be used to process a set of Ontologies representing different sets of data into one or more sets of database entries, with those entries having the same or different data schemas. This provides a way for an organization's data to be converted from an Ontology or Ontologies into a form in which that information can be stored in a database that is best suited to the users' needs.

Embodiments of the system(s) and methods described can therefore be used to perform one or more of the following:

access an Ontology representing previously known data and information and generate database entries and tools for querying a database formed from those entries;

this can enable the same data to be stored in and accessed from multiple databases, each of which may have its own desirable features for certain users; if necessary, the accessed Ontology can be converted to an appropriate format (JSON or otherwise) prior to being processed with an appropriate implementation or form of the Ontology Reader described herein;

in some embodiments, an Ontology may be generated or created from existing data stored in a database (using an appropriate implementation of the Ontology Generator described herein) and that Ontology used as the basis for further processing in accordance with the methods described herein;

access an Ontology being created (in JSON or other format) to represent newly discovered or learned data and information and generate database entries and tools for querying a database formed from those entries;

the database can be a newly created one or one used for storing existing data, and as the Ontology is changed to reflect new data, the processes described herein can be used to generate new database entries;

all data relating to a specific subject can be stored in a common database after processing of a set of Ontologies—this may allow broader access to the data by members of an organization;

data related to a sub-set of the subject can be stored in a common database, with the specific data stored and those having access depending on the needs of users, the nature of the data (private, public, etc.), whether a specific research project is being performed with controlled access to data, etc.

FIG. 1 is a diagram illustrating an example of a system 100 for generating database schema based on an Ontology, with an Ontology Reader module or function being used to provide inputs for schema generators for Graph, Columnar, and Relational databases, in accordance with some embodiments. This architecture may be used, for example, to process an existing Ontology and convert it into a JSON format and then into schemas for different databases. This is done to provide a mechanism for translating the information in the Ontology into database entries that may be stored and queried.

As shown in the figure, an Ontology 102 is accessed by an Ontology Reader 104. In one embodiment, Ontology Reader 104 masks the format of an Ontology and returns the entities and their relationships in a standardized (or canonical) format. This enables system 100 to generate schema for different types of databases, as indicated in the figure by the examples databases of Graph Database Schema Generator 106, NoSQL Columnar Store Database Schema Generator 108, and Relational Database Schema Generator 110. An example of code that may be used to generate an Ontology Reader is provided in the Appendix to this application, which forms a part of and is included in its entirety into this application. In some embodiments, the processes and methods described with reference to FIG. 1 may be used to construct database entries from an Ontology. In general, FIG. 1 illustrates how an Ontology may be used to generate database entries for one or more databases by using an Ontology Reader and an appropriate schema generator. This permits the data in the Ontology to be stored in a desired type of database or in more than one database.

Although, generating a database schema from an Ontology is helpful, it doesn't provide a complete solution to the larger data access and retrieval problem. Since data may be stored in multiple databases, the act of finding data can be extremely confusing and inefficient. Expecting consumers of data to individually determine where a piece of data is located, connect to the appropriate database, and to construct and execute a query is a not realistic requirement for many users and in many situations. Therefore, it is useful to abstract where the data comes from. To do this, some embodiments utilize a Data Retrieval API. This approach provides two important advantages:

1. Consumers of data do not need to worry about where data comes from. They can use a single query interface to locate and request data regardless of where the data is stored; and
2. Flexibility is provided in where data is stored. Since clients are not relying on direct dependencies of individual databases, one can move data freely among databases (as long as the API "contracts" are fulfilled). This may provide benefits in terms of permitting a user to store data in a database that provides specific benefits or transferring data between databases to make the data available to more users.

Creating an API to interact with individual databases, each with possibly different schemas and query languages, can be a labor-intensive process. As the number of databases and Ontology sizes increase, such a manual process rapidly becomes unscalable and inefficient. Therefore, it is beneficial to create an API that is automatically generated from an Ontology and that can scale with the database and Ontology complexities. This is another feature of the systems and methods described herein—generating an API from an Ontology to enable access to data in multiple databases.

Ontology-Generated API for Data Retrieval

Figure 4:
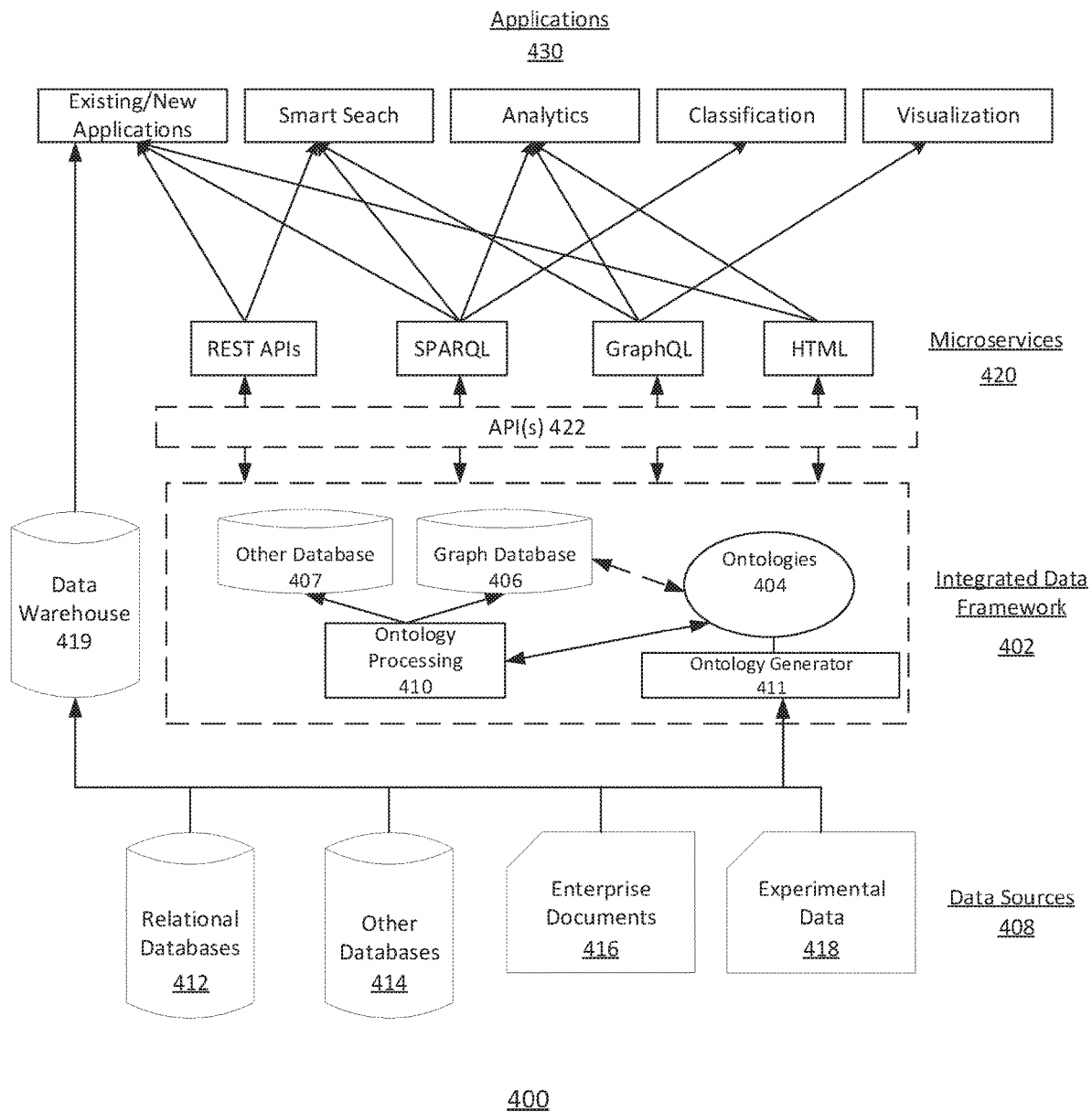
FIG. 4 is a diagram illustrating how an ontology and embodiments of the system and methods described herein may be used as part of an Integrated Data Architecture and Framework for an organization.

An API for an Integrated Data Framework of the type described herein with reference to FIG. 4 should preferably meet the following requirements:

1. The API needs to be able to understand where different datasets are located, read the schemas of those databases, and match the query results to an expected output; and
2. The API needs to serve data in a predictable format that matches the Ontology.

Hand-coding an API layer is not an efficient approach—changing Ontologies and subsequent database schema fluctuations make it unscalable. Therefore, the inventor(s) developed a method for generating an API from an Ontology.

In some embodiments, code-generation for the API functions or operates based on the following guidelines:

1. The format of the API function signatures are predictable;
2. The return payloads' formats from the API functions are predictable; and
3. The methods for retrieving Ontology-defined entities from database(s) are predictable.

Because the database schemas are generated in a predictable way, this approach can satisfy guideline (3) by using the same logic used to generate the database schemas—e.g., because Ontology Entity A was generated in format X in Database 1, one can fetch Entity A from Database 1 by formatting a query using the sub-schema X. This leaves constraints or requirements (1) and (2)—that is, how to generate the API function signatures, and guarantee their payloads?

Generating API Functions and Payloads from an Ontology

In some embodiments, the GraphQL standard is used to create a data retrieval API. One benefit of this approach is that the strongly typed nature of GraphQL naturally aligns with the goals for an Integrated Data Framework. This is at least partly because clients are able to query a set GraphQL Schema and predict the returned payload due to the strongly typed properties for each object. This allows the creation of function signatures and allows clients to inspect the GraphQL Schema in order to predict the return payload format. Therefore, by generating a set of GraphQL Schemas, and the respective functions to fetch data from the database, embodiments can generate a complete API to fetch data based on an Ontology without hardcoding individual entities. This produces an Ontology-driven API.

Figure 2:
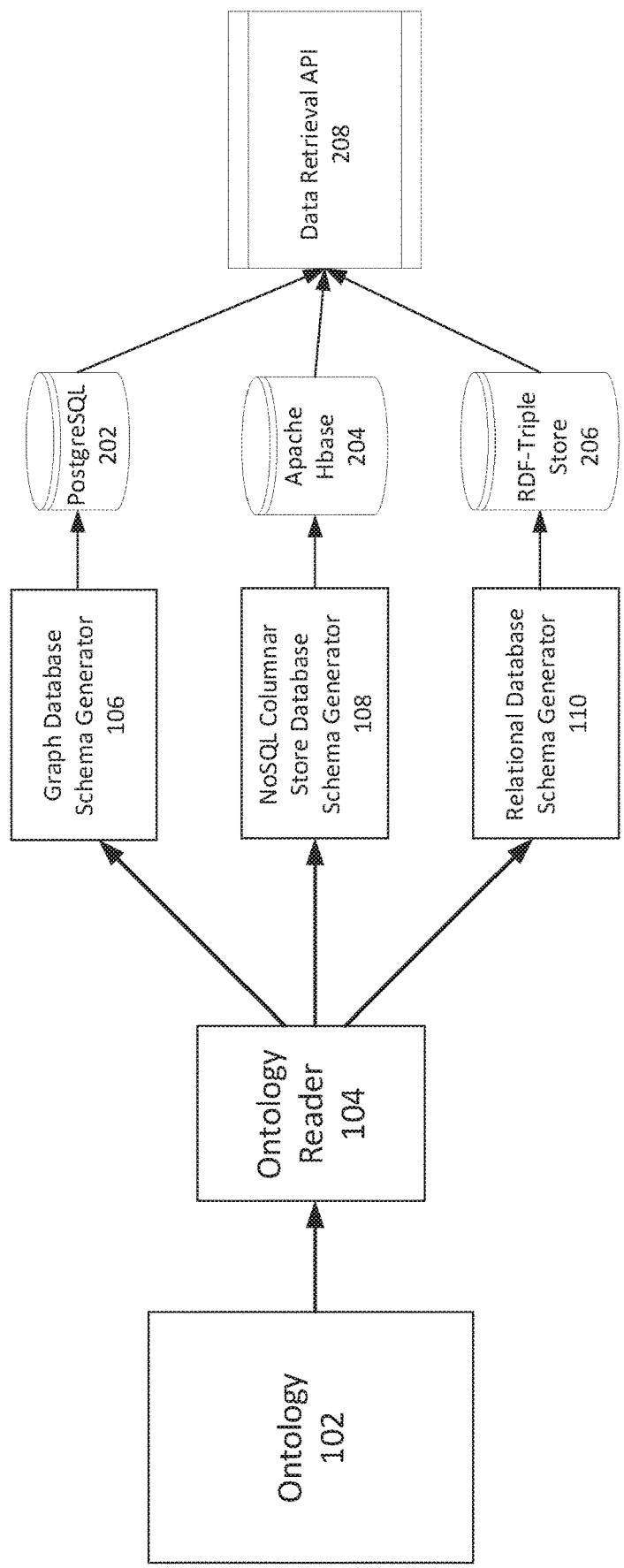
FIG. 2 is a diagram illustrating the use of a Data Retrieval API to abstract database complexity as part of the system for generating database schema of FIG. 1, in accordance with some embodiments.

FIG. 2 is a diagram illustrating the use of a Data Retrieval API to abstract database complexity as part of the system for generating database schema of FIG. 1, in accordance with some embodiments. This permits a user to search a database that is part of the system without requiring a specific API for each database. As shown in the figure, each example schema generator (elements 106, 108, and 110 in the figure) is coupled to or otherwise in communication with a database or other form of data storage element. These are indicated by elements 202, 204, and 206 in the figure, and labeled as PostgreSQL 202 (associated with Graph Database Schema Generator 106), Apache Hbase 204 (associated with NoSQL Columnar Store Database Schema Generator 108), and RCF Triple Store 206 (associated with Relational Database Schema Generator 110). Each of the databases or data stores is coupled or otherwise in communication with Data Retrieval API element 208. In some embodiments, the processes and methods described with reference to FIG. 2 may be used to access a database that includes database entries constructed from an Ontology. Thus, while FIG. 1 and the description of its processes (such as the Ontology Reader and schema generators) illustrate how an Ontology may be used to generate database entries for a desired type of database, FIG. 2 and the description of its processes (such as API function signatures and payloads) illustrate how the Ontology may be used to generate tools for querying or searching that database.

Figure 3A:
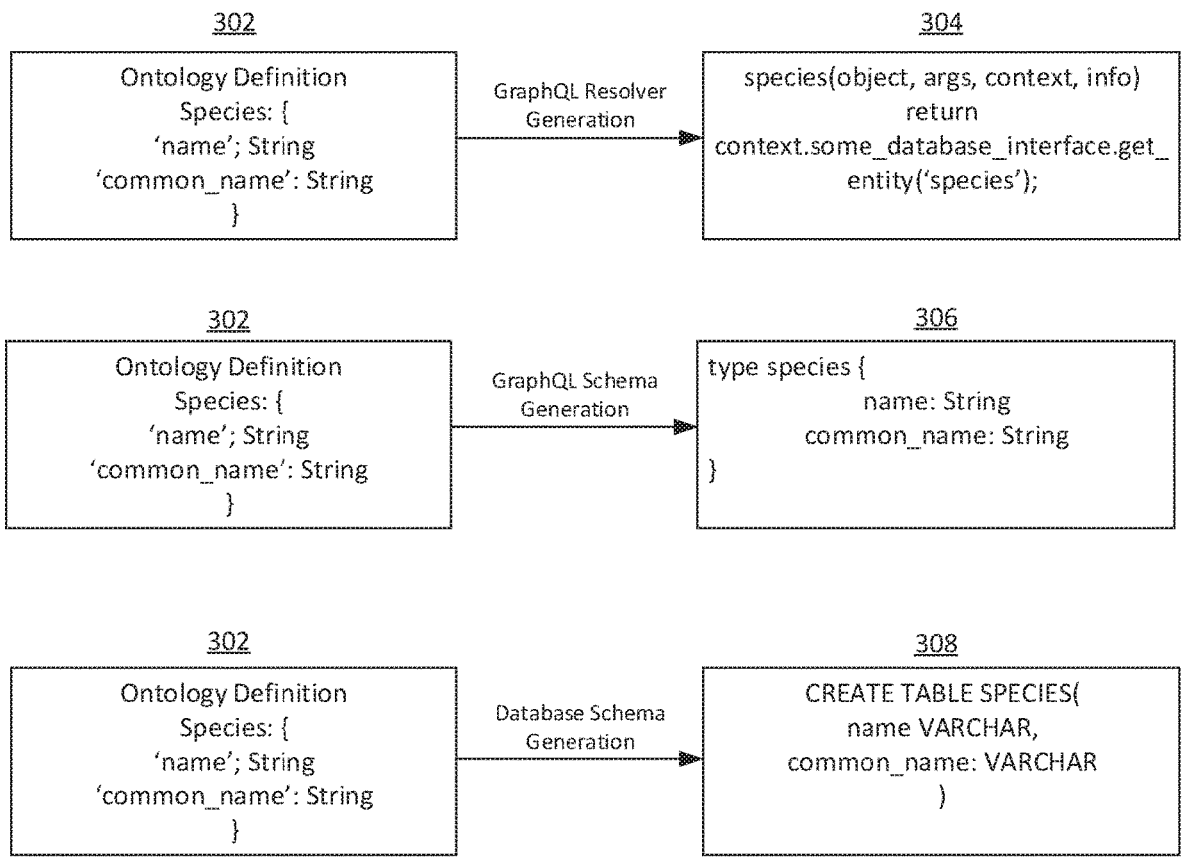
FIG. 3(A) is a flow diagram or flowchart illustrating example data access and processing steps or stages that may be used to generate database schema(s) and a database resolver in accordance with some embodiments.

FIG. 3(A) is a flow diagram or flowchart illustrating example data access and processing steps or stages that may be used to generate database schema(s) and a database resolver, in accordance with some embodiments. As shown in the figure, in some embodiments, an Ontology Definition 302 may be expressed in (or converted into) a JSON (JavaScript Object Notation) format or notation that includes a species definition in the form of a name and common name.

Using the techniques and methods described herein, the Ontology Definition 302 may be used as the basis for generating a GraphQL Resolver 304. Ontology Definition 302 may also be used to generate GraphQL Schema 306 using the techniques and methods described herein. Further, Ontology Definition 302 may also be used to generate Database Schema 308 using the techniques and methods described herein. Note that because the resolvers are JavaScript code, they are Turing-Complete and can connect to any database.

Figure 3B:
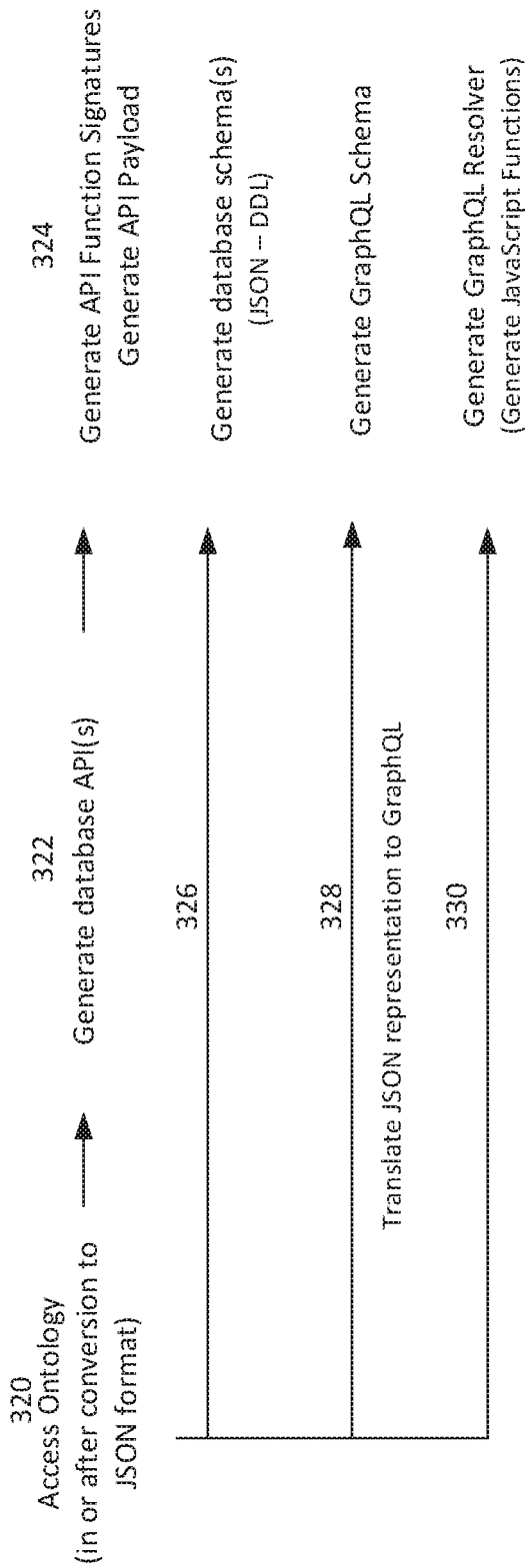
FIG. 3(B) a flow diagram or flowchart illustrating example data access and processing steps or stages that may be used to generate database API(s), database schema(s) and a database resolver in accordance with some embodiments.

FIG. 3(B) a flow diagram or flowchart illustrating example data access and processing steps or stages that may be used to generate database API(s), database schema(s) and a database resolver in accordance with some embodiments. As shown in the figure, an Ontology that is represented in (or has been converted to) JSON format is accessed at step or stage 320. This representation is then processed using the techniques and methods described herein. The Ontology representation may be used to generate a database API, as shown at step or stage 322. The database API may then be used to generate API function signatures and API payloads, as shown at step or stage 324. The Ontology representation may also be used to generate database schemas, as shown at step or stage 326, typically by a translation or conversion of JSON to a suitable data description language (DDL). The Ontology representation may also be used to generate GraphQL schemas, after (if needed) a translation or conversion of the JSON format to GraphQL, as shown at step or stage 328. The Ontology representation may also be used to generate GraphQL Resolver(s), as shown at step or stage 330. As shown in the figure, once an Ontology is parsed by the Ontology Reader, the schemas, resolver and APIs can be generated independently of each other. This provides an efficient approach to creating the elements and functionality needed to generate database entries and access a database.

As shown in FIGS. 3(A) and 3(B), in some embodiments, the following steps, stages, functions, operations or processes may be implemented (typically by an electronic processor executing a set of instructions or software stored on (or in) an electronic data storage medium):

1. An Ontology is parsed, transforming the JSON-Schema or format into a Data-Definition-Language (DDL) used to create the Database Schema;
2. The Ontology is parsed by a GraphQL Resolver Generator to create JavaScript code to access a database. The actual operation of accessing a database may be abstracted by an interface, to simplify the generated code; and
3. The Ontology is parsed by a GraphQL Schema Generator, transforming the JSON-Schema or format into a GraphQL Schema.

At a high-level and in general terms, Step (1) creates a Database schema which enables storing information in an Ontology in a database, Step (2) creates the GraphQL API code to access that schema, and step (3) creates the GraphQL API Schema to facilitate querying the code generated in step (2), which then queries the database entries created in Step (1).

From one perspective, embodiments operate to perform a general process to create and access a database based on an Ontology. In some embodiments, this starts with an Ontology that has been created to define the organization of, and relationships between, a set of data related to a specific topic. The processes described herein enable use of the Ontology in JSON format (or after conversion into that format or into a suitable other format) to generate database entries for the data represented by the Ontology and also to generate a set of database tools to allow a user to access/query that data in a database. Note that the Ontology itself may be in JSON format, RDF format, or another suitable format. The format may determine the structure of the Ontology Reader described herein, but the format is not a limitation on the use or implementation of the system or processes described.

Generating a GraphQL Schema from an Ontology

As described, one aspect of embodiments of the system and methods described herein is the generation of a GraphQL schema from an Ontology. This form of schema may be used to generate APIs and payloads for a database. GraphQL is represented by a Schema Definition Language (SDL). One can create a GraphQL Schema directly from an Ontology by representing Ontological entities in GraphQL. However, there are a few constraints when translating a JSON-Schema-based Ontology to GraphQL:

1. GraphQL does not support inheritance, so all properties of a parent class must be represented in the child class; and 2. As per the GraphQL specification, has-many associations must be represented as an array of nested objects.

Even given these constraints, there are sufficient benefits to using GraphQL to make it desirable in implementing a data storage and retrieval architecture of the type described herein. For example:
- GraphQL lets the client specify the data required with each request;
- GraphQL uses a strongly typed system to describe the data; and
- GraphQL makes it easier to aggregate data from multiple sources.

Generating a GraphQL Resolver from an Ontology

Once GraphQL Schemas are generated, an API needs to know how to fetch the entities that correspond to the schema. GraphQL queries are nested, so each entity can be resolved individually. For example, in the case of cell data, a return payload can have the species and sex objects fetched in separate queries after the parent donor object is fetched. This might be accomplished using the following query:

```
donor {
    name: 'xsd1456'
    species: {
        name: 'Mus musculus'
        common_name: 'Mouse'
    }
    sex: {
        name: 'male',
        abbreviation: 'M'
    }
}
```

Note that since the processes described herein have established rules and conventions for how an entity is stored in the database, one can successfully generate code to fetch these entities. In one example, this may be implemented via string templating JavaScript functions. Generating GraphQL Resolvers is possible by using the logic already in place to generate the database schemas. The database schema generation logic informs a user where an entity is stored, and how it is formatted.

As mentioned, a code-generated API layer or capability is important to create an Ontology-driven data framework because it allows holding data in multiple data stores while retaining flexibility with regards to accessing data. By generating the database schemas, the system can use the same logic to generate GraphQL Schemas and Resolvers, which allows creating an API that is not coupled to entities defined in the Ontology.

One application or use case for the Ontology derived database schema, API, and search query methods described herein is in the implementation of an Integrated Data Architecture. Users and consumers of data benefit from a data access architecture that functions to unify and enable better understanding of information across all of an organization's data. Such an architecture also assists in better managing the data life cycle. It is believed that such an architecture can help enable and improve the organization and discovery of knowledge, increase the value of existing data, and reduce complexity when developing next-generation applications.

FIG. 4 is a diagram illustrating how an Ontology and the methods and system described herein may provide a basis for constructing an Integrated Data Framework, which may be part of an Integrated Data Architecture 400 for an organization. The figure illustrates an Integrated Data Framework that is driven by an Ontology (as suggested by element(s) 404). The processing and methods described herein may be included in the functions performed by an Ontology Processing engine (as suggested by element 410 in the figure); the engine can operate to create both a database (database entries, for example) and an API layer (for querying the database) that can be driven and auto-generated by an Ontology. Microservices, applications, and transformation pipelines can then leverage the generated APIs to create additional functionality and applications.

As shown in the figure, an example Integrated Data Framework 402 may include a set of Ontologies 404. The Ontologies 404 may represent newly discovered data or represent previously known data. Ontologies representing previously known data may be stored in an existing database, such as one of data sources 408. Data Sources 408 may include one or more of Relational Databases 412, Other Databases 414, Enterprise Documents 416, and Experimental Data 418. Data Sources 408 may also be stored or accessed via a Data Warehouse 419 that can provide data access for existing or new application(s). In some embodiments, data stored in an existing data source 408 may be subjected to the operation of an Ontology Generator 411 that functions to organize a set of data and generate an Ontology from that data. Ontology Generator 411 may operate automatically, semi-automatically or rely on human inputs to generate an Ontology. In one embodiment, Ontology Generator 411 may generate a set of displays and user-interface tools to enable a user to arrange data or subjects for data into a graphical or other format to provide a rule, example, or guidance for the operation of Ontology Generator 411 in its processing of a set of data.

Whether generated from new data or generated by converting previously acquired data, Ontologies 404 serve as the basis for further processing that produces the Integrated Data Framework 402. As described, Ontologies may be subject to certain processing steps or stages, represented by Ontology Processing 410 to create database entries, store those entries in a database and provide tools for the accessing and querying of the database formed from those entries. As described, the processing of an Ontology may create database entries in one or more schemas or formats. Similarly, the resulting database entries may be stored in one or more types of databases associated with those schemas. These databases are represented by Graph Database 406 and Other Database 407. Note that although a Graph database is illustrated, the methods and processes described herein may be used to generate database entries, a resulting database, and tools for accessing and querying the resulting database for one or more types of databases. These include Graph databases, relational databases, etc., with the type created depending in the specific database schema generator used.

Integrated Data Framework 402 provides both Ontologies and if desired, other sources of data in a common format. The data stored as part of Integrated Data Framework 402 may be accessed using one or more microservices in a Microservices Layer 420. Microservices, also known as a microservice architecture, is an architectural style that structures an application as a collection of loosely coupled services, which implement various analytics capabilities.

The microservices layer allows the system 400 to mask the operational complexity of multiple databases and provides an API or APIs (illustrated as the API(s) layer in the figure, although this may be part of or in addition to other elements of the microservices layer 420) to retrieve data for front-end applications. Microservices typically segment functionality into separate applications that are loosely coupled by RESTful APIs, or, following the RDF standard, SPARQL endpoints. Each microservice is self-contained, and the microservices do not share a data layer. Each one typically has its own database and load balancer. Individual microservices may require different scaling techniques. For example, some microservices might use relational databases whereas others might use graph databases.

The microservices layer is coupled to an Applications Layer 430. The Applications Layer includes one or more applications that may be used to perform various data processing functions on the data in Integrated Data Framework 402. These applications or data processing functions may include one or more of searching, visualizations, analytics, classification, etc.

Example Queries

In some use cases, a server needs to support two queries for project inventory/specimen summary pages:
  Return a tabular information for a single project or for the project inventory, with options for filtering and sorting along critical sampling dimensions; and
  Return a term aggregation for the specimen counts for specimen summary table or project inventory table. The aggregation should be on the subspecimen_type dimension along with a single other critical sampling dimension. This can be thought of as:
    SELECT subspecimen_type, ${critical sampling dimension}, SUM(specimen_count) GROUP BY (subspecimen_type, ${critical sampling dimension}).

In some use cases, these two queries need to be run for a project's specimen summary metadata, as well as the project inventory page. Each project has a different set of critical sampling dimensions that are used to represent its Specimen Summary. Since GraphQL is a typed language, one may need to have a different type for each project's specimen summary.

As a system adds more projects, manually creating schemas and resolvers for each project will quickly become unrealistic and inefficient. Therefore, as described, the inventor(s) developed techniques to auto-generate the schemas and resolvers for each project (as described in greater detail herein and below).

Example Architecture for a GraphQL Server

Following is a description of certain features, functionality and capabilities of a GraphQL server that may be used as part of the system or framework described herein. Such a server enables queries to be constructed and executed over a database comprised of database entries generated by use of the methods and processes described herein. The queries or searches are constructed using the GraphQL schema and resolver process described and are executed over the database using the process for generating an API that is described.

A GraphQL Server is typically divided into four (4) different layers—a Schema, Resolver, Model, and Connector.
  Schema—The GraphQL Server Schema;
  Resolver—JavaScript functions provided to the Apollo Framework to fetch data to fulfil queries or represent objects in the GraphQL Schema. These should be simple calls to the Model. (a resolver is a function that is responsible for populating the data for a single field in a schema. It can populate that data in the way defined, such as by fetching data from a back-end database or a third-party API);
  Model—Creates batch queries to the connector; and
  Connector—Queries the database and repackages/reformats returned values for the GraphQL Schema.
Directory Structure (following is an example of a possible software architecture for use in implementing a GraphQL server that may be part of some embodiments)
  src/Connector contains the database connection module, including interface and factory definitions.
  src/GraphQLSchema contains the code to generate GraphQL Resolvers and Schemas, as well as prebuild resolvers and schemas.
  ProjectSchemaContext contains a module to fetch information on various projects and expose them through typescript object definitions.
  Resolver contains code to generate Javascript functions for queries and ontological entities.
  Schema contains code to generate a GraphQL Schema string for queries and ontological entities.
  src/GraphQLTypes contains TypeScript representations of prebuilt GraphQL types used to build queries.
  src/Model is a module that creates dataloader for each ontological entity and batch queries the database.
  src/OntologyContext is a module that reads the ontology and exposes it through an interface.

Schema and Resolver Generation (Examples)

The GraphQL Schema definitions and the corresponding JavaScript resolver functions would typically need to be auto generated for each individual project, as well as resolvers for each entity in the Ontology.
Prebuilt Schemas
Before describing project-generated schemas, it is helpful to have a common library of types and inputs. These are found in src\GraphQLSchema\Schema\Prebuilt.
Generated Schemas
In this example, each project's Specimen Summary will have 2 queries—one to fetch data with filtering and sorting options, and one to run the term aggregation described above. Since these two queries will be generated for each project, the following naming convention is used:

get_specimen_summary_${project_name} ( filter: filter_input_${project_name} sort: sort_input_${project_name} limit: Int = 500 offset: Int = 0)

get_subspecimen_term_aggregate_${project_name}( property list: [critical_dimensions_${project_name} filter: filter_input_${project_name})

Filter

The filtering input denotes filtering operations on a critical sampling dimension.

```
input filter_input_${project_name}( field: critical_dimensions_${project_name} operator:
operator value: string)
```

Sort

The sorting input denotes sorting options on a critical sampling dimension.

```
input sort_input_${project_name}( field: critical_dimensions_${project_name} order:
sort_order )
```

Generated Resolver
    Each query and ontological entity need to map to a resolver function in the Apollo Framework. For a project-based query, a call is made to the GenericProjectModel model, and for individual entities within a project, calls are made to the dataloader.
    Note: in one embodiment, this approach can be refactored so that all calls go through the dataloader. This permits one to deprecate the GenericProjectModel class.
Ontology Entity Resolvers
    Each entity in the ontology should have a generated resolver function. These are generated in OntologyResolverGenerator.ts.
Model
    An embodiment uses DataLoader as a batch query tool. The source code is located at: https://github.com/graphql/dataloader;
    The "Model" class constructs a new dataloader for each entity type in the Ontology. This allows the use of batch queries to a database for repeated entities in a nested GraphQL response.
Connector
    An embodiment uses Sequelize as the ORM to communicate with a Postgres Database: http://docs.sequelizejs.com/
    To avoid manually creating the Sequelize entity definitions, the embodiment uses Sequelize-Auto to generate these through introspecting the PostgreSQL database (assuming that the PostgreSQL schema matches the Ontology).
    The PostgreSQL database consists of tables representing Ontological entities as well as a table for each project. The table for each project is the name of the project, with denormalized columns representing critical sampling dimensions.
    Multiple associations are stored as Arrays in the PostgreSQL tables, so there is logic in the SequelizeConnector class to unpack these arrays while running Term Aggregation queries.
The PostGres Database constructed by these queries may be generated by a script. This can be a temporary approach until an ingest system is developed. Modify the credentials in create jdfpostrgres.py and run python create jdf_postgres.py.

Further details and information regarding the implementation of an Integrated Data Framework and Architecture based at least in part on the systems and methods described herein may be found later in this application. That information discusses the motivations for an Integrated Data Framework and how such a framework may be part of a larger Data Architecture that utilizes the methods described herein to provide for an Ontology based approach to database construction and access.

In addition to the database search and data access functions described, note that the methods and approach described herein may also be used for the following, which may provide additional features or benefits, including construction and execution of search queries:
    Automated generation of Schema API from an Ontology;
    Automated generation of API Resolver source code from an Ontology; and
    Automated generation of multiple Database Schemas and interfaces (APIs) from an Ontology, and hence an ability to generate database entries from an Ontology and then access and search a database formed from those entries. The database generated by storing the database entries may be of any desired type or structure, including but not limited to a Graph database, a relational database, etc.

Thus, in some embodiments, the techniques described may be used to convert or transform an Ontology or similar data structure into a tool for generating database entries, followed by accessing, and searching a database formed from those entries. In some embodiments, the methods described herein may be used to convert or transform an Ontology into the tools needed to generate a database (i.e., the schema API, API resolver source code and database schema) and then store data associated with the Ontology topics or categories in the database for later access by executing queries or searches.

Figure 5:
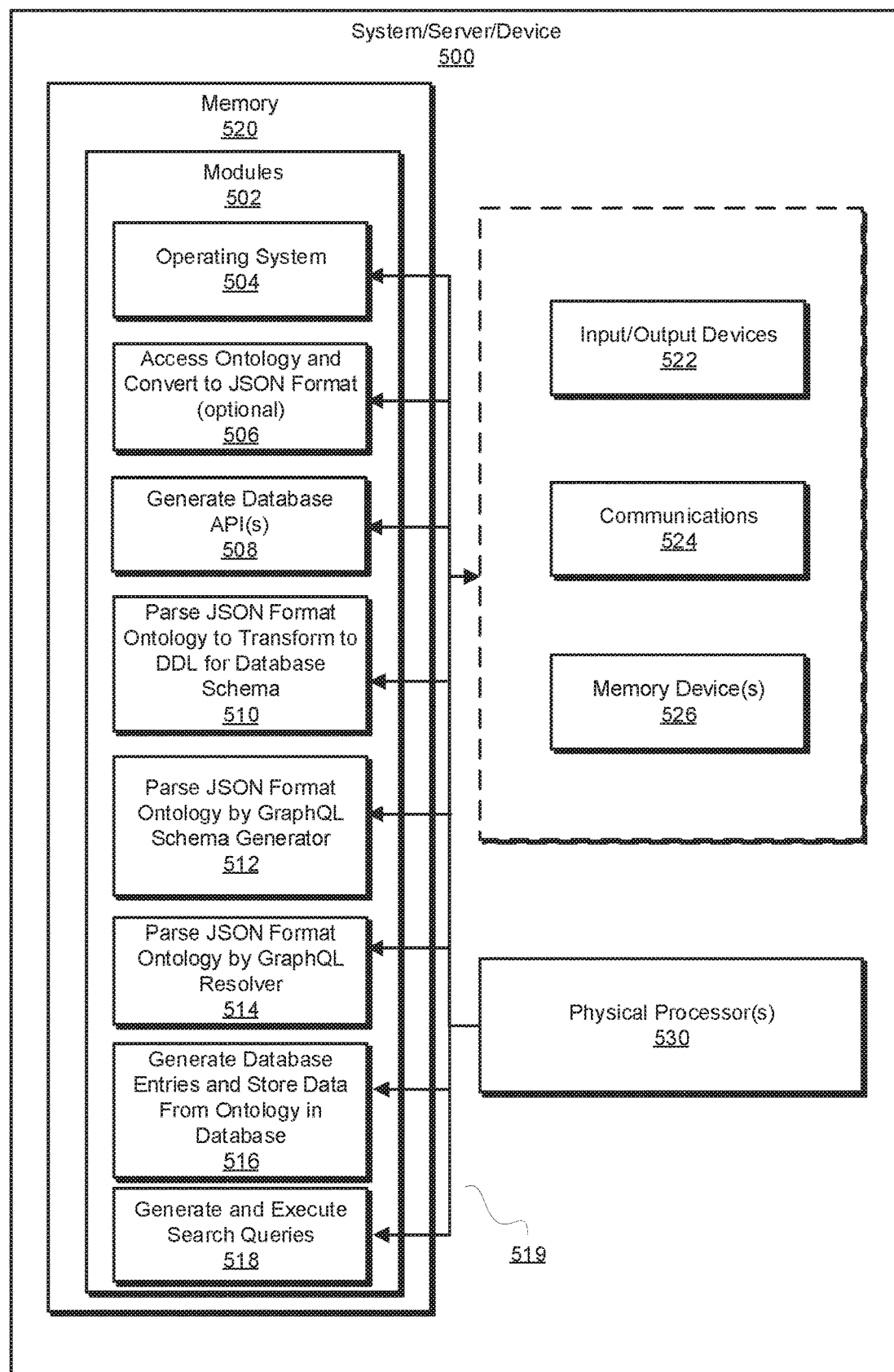
FIG. 5 is a diagram illustrating elements or components and concepts that may be present in a computing device, server, or system 500 configured to implement a method, process, function, or operation in accordance with some embodiments.

FIG. 5 is a diagram illustrating elements or components and concepts that may be present in a computing device, server, or system 500 configured to implement a method, process, function, or operation in accordance with some embodiments. As noted, in some embodiments, the disclosed system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a specific function, method, process, or operation that is implemented by the module or sub-module. Such function, method, process, or operation may include those used to implement one or more aspects of the disclosed system and methods, such as for Accessing an Ontology, represented in a JSON-Schema (or other format which can be processed by a suitable Ontology Reader or similar functionality);
If necessary, converting an Ontology into a JSON-Schema and storing the result prior to further processing;
Parsing the Ontology, transforming the JSON-Schema into a Data-Definition-Language (DDL) used to create a Database Schema for a desired database form or structure;
Parsing the Ontology by a GraphQL Resolver Generator to create JavaScript code to access a database. The actual operation of accessing a database may be abstracted by an interface, to simplify the generated code;
Parsing the Ontology by a GraphQL Schema Generator, thereby transforming the JSON-Schema into a GraphQL Schema;

Note that the steps or processes listed above create a system and associated methods for creating database entries and accessing and searching a database generated from an Ontology. In a typical use case, the steps or processes below would then be used by a user to create the database and access the data stored in the database:

Generating database entries and storing data from an Ontology in a new database;
Generating a search query that may be executed on the new database; and
Returning the results of an executed query to a user.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, FIG. 5 is a diagram illustrating elements or components and concepts that may be present in a computing device, server, or system 500 configured to implement a method, process, function, or operation in accordance with some embodiments. The computing device, server, or system 500 contains a set of modules 502, with each module containing executable instructions that when executed by an electronic processor implement a method, process, function, or operation in accordance with embodiments of the invention.

As shown in the figure, system 500 may represent a server or other form of computing or data processing device. Modules 502 each contain a set of executable instructions, where when the set of instructions is executed by a suitable electronic processor (such as that indicated in the figure by "Physical Processor(s) 530"), system (or server or device) 500 operates to perform a specific process, operation, function or method. Modules 502 are stored in a memory 520, which typically includes an Operating System module 504 that contains instructions used (among other functions) to access and control the execution of the instructions contained in other modules. The modules 502 in memory 520 are accessed for purposes of transferring data and executing instructions by use of a "bus" or communications line 519, which also serves to permit processor(s) 530 to communicate with the modules for purposes of accessing and executing a set of instructions. Bus or communications line 519 also permits processor(s) 530 to interact with other elements of system 500, such as input or output devices 522, communications elements 524 for exchanging data and information with devices external to system 500, and additional memory devices 526.

Modules 502 include instructions that when executed cause system 500 to perform one or more functions. For example, Access Ontology and Convert to JSON Format Module 506 may contain instructions that when executed cause system 500 to access an Ontology in a database and convert it to JSON format by use of the Ontology Reader described herein. Generate Database API(s) Module 508 may contain instructions that when executed cause system 500 to create or otherwise generate API function signatures and API payloads from the JSPON format Ontology. Parse JSON Format Ontology to Transform to DDL for Database Schema Module 510 may contain instructions that when executed cause system 500 to create or otherwise generate database schema(s) by converting the JSON format of an Ontology to one or more database schemas using a data-definition-language (DDL) for a database. Parse JSON Format Ontology by GraphQL Schema Generator Module 512 may contain instructions that when executed cause system 500 to create or otherwise generate GraphQL schemas from the JSON format Ontology. This may require translating JSON to GraphQL in some examples. Parse JSON Format Ontology by GraphQL Resolver Module 514 may contain instructions that when executed cause system 500 to create or otherwise generate GraphQL resolver functions from the JSON format Ontology (in one example, by generating the desired JavaScript functions to act as a resolver). Generate Database Entries and Store Data From Ontology in Database Module 516 may contain instructions that when executed cause system 500 to create or otherwise generate database entries for data that is part of an Ontology and store that data in a database. Generate and Execute Search Queries Module 518 may contain instructions that when executed cause system 500 to permit a user to generate and execute a search query over a database and to receive the results of the executed query or search.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

Additional Information Regarding an Embodiment of an Integrated Data Architecture and Framework As mentioned, one embodiment or use of the methods and techniques described herein is a system architecture to provide access to data stored in multiple databases. This is accomplished by using an Ontology or Ontologies to generate database entries and tools to enable access to, and search of, a database that includes or stores those entries. This allows data originally stored in different databases to be accessed and more efficiently utilized by creating entries for a new database generated from an Ontology. In addition to generating the database entries, the Ontology is also used to generate tools for accessing and searching the database. The following sections provide additional information regarding the motivations for such an architecture and how it may be implemented.

One application or use case for the Ontology derived database schema, API, and search query described herein is that of a system that implements an Integrated Data Framework (IDF). Users/consumers of data would benefit from a data access system or framework for unifying and understanding information across all of an organization's data and to better manage the data life cycle. It is believed that such a framework can help enable and improve the organization and discovery of knowledge, increase the value of existing data, and reduce complexity when developing next-generation applications. The following is a description of such a system, its benefits, and its implementation.

Acronyms, Terms, and Definitions

Fundamental knowledge of concepts, relations, rules, and processes are largely "outside" the data itself (in scientists' heads, in papers, design documents, etc.); making translation necessary, yet difficult, for data consumers.

The framework described herein is an internal knowledge management system, into which data from existing sources can be integrated and from which data can be shared with applications. The IDF can serve as an access point for any application with requirements to search and discover data and information across an organization's data and databases or to extract new information from interconnected data. Future applications that may utilize and benefit from the IDF include an information-centric search interface, document classification tools, content management systems, advanced analytics tools, artificial intelligence agents, etc.

In terms of functional requirements, an IDF should be able to (in general):

| Acronym | Term | Example Definition |
|---------|------|--------------------|
| API | application programming interface | A defined method of communication between data sources and applications. |
| CWA | closed world assumption | A presumption in formal logic that says what is true about something is also known to be true. |
| FAIR | Flexible, adaptable, interoperable, and reusable | A set of principles for integrating and sharing data. |
| IDF | integrated data framework | A proposal for representing and combining data. |
| IDK | Integrated Data and Knowledge | The project for implementing an IDF. |
| MVP | minimum viable product | A product with enough features to satisfy early customers and provide feedback for future development. |
| OWA | open world assumption | The opposite of the closed world assumption in that a statement is true is irrespective of whether or not it is known to be true. |
| RDF | Resource Description Framework | A W3C standard for achieving data integration using web architectures. |
| SPARQL | SPARQL Protocol and RDF Query Language | An RDF language for merging and querying data. |

Users need an integrated data framework for unifying and understanding information across all of an organization's data and to better manage the data life cycle. It is believed that such a framework can help enable and improve the organization and discovery of knowledge, increase the value of existing data, and reduce complexity when developing next-generation applications.

The concept of an integrated data framework is derived from a recognition that, though an organization's current systems may support robust applications, they do not necessarily facilitate efficient solutions to key questions; that is, solutions that are centered around information-centric data management. Current information management needs to be improved to overcome several challenges:

Data is lacking in semantic consistency. This means it is increasingly difficult to know what is meant by one piece of data in one system and the same piece of data in another system. This is an impediment to asserting knowledge about our data;

As new data is modeled and produced, it becomes increasingly difficult to "fit it into" existing systems. The effort to do so is difficult and time-consuming;

As data complexity increases, systems lose uniformity of structure and meaning. For example, some databases combine tabular, hierarchical, and JSON data structures, making it difficult to write queries and integrate data; and Integrate new and existing data;
Scale to accommodate high volumes of data;
Perform queries quickly and efficiently;
Adapt to changing knowledge about data;
Support learning system that becomes better over time; and
Have the ability to perform advanced discovery across connections between images and text.

Currently, most information/data is organized in a mode that has been termed "container-centric," that is, though a user seeks information, in order to find that information the user must first find its container (the book, article etc. that it is contained in). Users typically follow this same behavior when locating scientific information; first they find a specific journal or book and then scan it to identify the information it contains. And with the advent of the Internet, users find more of the same: information is contained within individual websites, and search engines point to those containers most likely to have the information a user seeks.

The excess of information—in journals, on the Web—makes it more and more difficult to efficiently use such a container-centric mode. Sometimes a "simple" query requires a user to go from website to website, assessing, assembling, and normalizing the information that is found in each site—this is a difficult, frustrating and laborious process. A similar situation is also true of the enterprise. In most companies, information is spread across a variety of disparate containers: internal websites and wikis (like Confluence), systems (like LIMS), and databases. Doing something constructive with this information frequently means time-consuming and costly work accessing and assembling the information.

A recent and somewhat unheralded change has turned this mode of information finding on-end. This change is termed "information-centric" because it starts with the belief that information should be accessible independent of its container; a belief made possible by modern web technologies. By using a common framework, creators and owners of information ensure that it is accessible across any number of containers. More importantly, it means that information is made semantically consistent and that this information can be meaningfully combined.

The concept of an integrated data framework is for unifying and understanding information across all of an organization's data. Such a framework can help enable the discovery of knowledge, increase the value of existing data, and reduce complexity when developing next-generation visualizations and applications. To do so requires a shift in how an organization understands and approaches its data management practices.

Particularly challenging is the ability to derive new insights from existing data. This is in part due to the container-centric nature of current forms of data management. Much of current data "lives" in relational databases and application code, and in these paradigms the data model circumscribes what can be said about the data. This means that it is particularly important to get the data model "right" before data is generated because, once created, it is assumed to be 'complete' and 'closed.' This is called the Closed World Assumption (CWA).

The CWA works well in data models where the domain is well known, and there are 'naturally' complete systems, like the fixed number of seats in an airplane. But unfortunately, the CWA does not work well with domains where 'completeness' cannot be assumed, that is where knowledge about the domain is still being discovered. CWA systems make it difficult to update the data model when something new is discovered or realized about the nature of the data. Moreover, downstream applications depend on the fixedness of the model for their functionality. This makes CWA systems and architecture "brittle," i.e., highly dependent on the initial understanding and modeling of the data. Workarounds to CWA systems include de-normalizing databases into separate warehouses or data lakes, but often the 'problem' of inflexible models persists along with potential losses in meaning (as when a table name in a source database is changed in the warehouse).

In contrast, the Open World Assumption (OWA) maintains that there is always more to be said about data; that what is not known to be true is simply unknown or 'waiting to be known.' Systems that follow the OWA, such as the IDF proposed herein, offer inherently "flexible" data models. In these systems, the data can enter the system 'schema-less', that is: without a data model fixing the known properties and relations of an entity in the domain. In OWA systems, the model can be added to, or altered, as more is known about the domain.

However, the Open World Assumption comes with a significant tradeoff. The logic that was implicit in CWA systems—such as "null" values implying a known state—must be made explicit in OWA systems. This is done by specifying rules, or axioms, about the nature of certain types of data. These rules carry weight: they allow OWA systems to make inferences and deduce facts about one's data.

An Example System and Architecture for an IDF

An integrated data framework (IDF) will enable the interoperation, enrichment, and discovery of information across an organization's multiple data sets, databases, and use cases. An IDF is an internal knowledge management system, a 'semantic layer', into which data from existing sources can be integrated and from which data can be shared with applications. It entails the creation of a technology stack and 'data wrangling' efforts, specifically the creation of Ontologies and the mapping of data to these Ontologies. An IDF can serve as an access point for any application with requirements to search across an organization's data or to extract new information from this interconnected data.

In some embodiments, the general requirements of an IDF system may include:
  Integrating new and existing data;
  Scaling to accommodate high volumes of data;
  Performing queries quickly and efficiently; and
  Adapting to changing knowledge about data.

To meet these requirements and overcome the challenges described above, it is desirable that an integrated framework adhere to the FAIR principles: findable, accessible, interoperable, and reusable. The FAIR principles state that data is to be described with rich metadata using a formal language for knowledge representation, where each metadata element is assigned a globally unique and persistent identifier. FAIR further states that this identifier should be retrievable using a standardized communications protocol.

Examples of Possible IDF Components and System Elements

Graph Data Model

A graph is a collection of objects that may be linked to one another. As a mode of knowledge representation, it is both simple and highly expressive. An individual statement or fact within a graph is composed of three elements: 1) a node or subject, 2) an edge or predicate, and 3) another node or object. Nodes are related together by an edge. Each statement is called a "triple", for its three-part structure. Triples can interrelate and connect, forming a network of information. Graphs are flexible in the sense that additional information about any node can be easily added. For example, if we wanted to say more about Scotland, we would just add additional statements connected to the "Scotland" node. This feature makes them less "rigid" than relational databases, where we might have to create a new schema to start capturing additional information about an entity—potentially breaking existing applications.

Further, graphs can carry information about the structure of the content alongside the content itself. The ability to add this kind of information is what is meant by "semantic." Semantics enables additional meaning, or knowledge, to be represented alongside the data such that the data can be better understood. Graphs formalize this meaning so that understanding is possible for both humans and machines consuming the data. For example, we can share this graph with other systems and what we mean by Author, and our assertion that Shakespeare is an Author, will be explicitly preserved across these systems. This is sometimes referred to as data being "ontologically consistent," an important and powerful feature for integrating data with other systems.

Ontologies

Ontologies are useful for capturing the conceptual information about a set of data, so that the data is defined and contextualized—this is what we mean when we say that data is "semantically enriched." We have "told" the search engine the meaning of our data, allowing it to contextualize (and integrate) the information about the subject(s) of the graph.

Ontologies support the integration of data by acting like templates into which various sets of data can be mapped. This means that an ontology can be reused across datasets. By using an existing ontology, data owners are not 'locked in' to a fixed data model. Ontologies can be added to, altered, and refined incrementally as needed for each site. Ontologies can also be used to derive inferences or new insights about the data. For example, we might state a rule, also called an axiom and from this rule, our system can infer something previously not stated about certain data. This is important because the data itself doesn't state this fact, and, though it is understood by humans that it must be the case, machines have no way of knowing this without the rule. This is a consequence of the Open World Assumption, but it also forces us to encode what it is that we (humans) know to be true. Ontologies communicate knowledge, enhance information discovery, derive new information from existing knowledge, and support the integration of data sources.

Graph Database

An integrated data framework requires a place to store integrated graphs of data, and this place is a graph database. A graph database is a database that has been optimized to store graphs. Because of the nature of the data model, where every subject, predicate, and object are "first class citizens," some graph databases are just relational databases with three columns (one for each component) and each row is a statement. Other graph databases are "inherently" graph-based, storing the networks as such. The particular implementation of a graph database may have consequences on its performance and capabilities (such as inferencing), and so represents an important decision point for creating the technology stack of an integrated data framework.

Resource Description Framework (RDF)

The standard integrated data framework was developed by the same team that created HTML and the World Wide Web. This standard is called the Resource Description Framework (RDF), and it provides a set of languages for encoding ontologies and data using a graph data model, along with languages for querying and exchanging the data. It is the most widely used integrated data framework in existence, with nearly every major e-commerce website adopting at least some form of RDF language to represent its products on the Internet.

In some examples, aspects of the Resource Description Framework include:

All data is represented in a single format (the triple).

Each triple is an assertion, a mini sentence composed of a subject, predicate and object. All data can be reduced to a set of triples.

All the subjects, all the predicates, and most of the objects are identified with globally unique identifiers (URIs, which are analogous to URLs)

Because the identifiers are globally unique, the system can join records, without having to write the explicit joins.

A database that assembles triples like this, is called a "triple store" and is in the family of "graph databases." A semantic triple store is different from a non-semantic database in that it is standards compliant and supports a rich schema.

Every individually identifiable thing (whether a person, a bank account or even the concept of "Bank Account") is given a URI. Wherever the URI is stored or used it means exactly the same thing. Meaning is not dependent on context or location.

New concepts can be formed by combining existing concepts.

The schema can evolve in place, even in the presence of a large database dependent on it.

A set of concepts so defined is called an "Ontology" (loosely an organized body of knowledge).

As noted, every element is assigned a unique global identifier using a URL-like path. This has advantages for disambiguating meaning: one just refers to the unique URL of the concept or individual. RDF is therefore built on web architectures by design. The RDF query language, SPARQL, uses the HTTP protocol, much like REST APIs, but with far more robust operations. It also means that developers do not need to create an additional representation layer in code in order to get direct front-end client access to the data.

Application to Databases and Technologies

An integrated data framework is a "semantic layer" that draws from and links together data from other data sources. An integrated data framework is a layer on top of these tried and true databases. It allows one to do more and discover more about the data than is currently possible using the databases. An integrated data framework assists in unifying and understanding information across all of an organization's data. Such a framework can help enable the organization and discovery of knowledge, increase the value of existing data, and reduce complexity when developing next-generation applications.

An integrated data framework (IDF) can be used to manage the interoperation, enrichment, and discovery of information across an organization and overcome the challenges of container-centric, closed-world systems. The IDF is an internal knowledge management system, a 'semantic layer', into which data from existing sources can be integrated and from which various applications can be built. For reasons that include the "brittleness" of closed-world systems and accordance with FAIR principles, we believe that our integrated data framework should use standardized tools and technologies, including: a graph data model and graph databases, ontologies, and the Resource Description Framework (RDF). These components, in harmony with the RDF standard, can be built as an integrating, semantic layer over existing technologies, like relational databases.

Example Capabilities and Functions

These capabilities follow the FAIR principles.

Findable—data in the IDF must be easily findable through search and discovery

Accessible—data must be accessible, via standard communications methods like APIs and endpoints Interoperable—system must be able to integrate data from multiple sources Reusable—data from the IDE must be able to be integrated with ease into other systems Semantic enrichment of data—data should be annotated with meaningful labels and definitions Flexible data schema—the data schema (ontology) should be flexible and adapt to new knowledge Probabilistic Matching—Find connections with uncertainty factor Versioning and Annotations—at various levels, the data should be annotated with version information Information architecture of data—the IDF should offer a
view of the data sources and structures
Interface for browsing the ontology—the IDF should offer
a view of the ontology and its annotations
Selective and bulk data extracts—the IDF should provide
for specified and bulk dataset extractions
Interface for building advanced queries—the IDF should
offer a user-friendly view for creating queries
Easy-to-use API—the IDF should offer an API for building applications and interfaces from data
Authentication—the IDF should control access to certain
datasets Example Technology Components The components that comprise an example integrated data framework technology stack are described in the following list:

| Component | Description |
| --- | --- |
| Integration Layer | In-place, unification of data sources. Bulk ETL/ELT (extract, transform, load, or extract, load, transform) of data from structured (SQL, RDF, LDAP), semi-structured (XML, JSON), and unstructured (Doc, PDF) sources. Workbench interface to manage repositories, data, user accounts and access roles. Ability to map data source metadata to ontology elements. |
| Ontology Editor | A tool for building and managing RDF ontologies, ideally: a workflow tool for approving, viewing, and versioning ontologies. |
| Unified Ontological framework | A unified Ontology for database |
| Database Layer | Data storage and indexing layer. Includes optimization for RDF triples. |
| Query System | An interface for developing and executing queries in SPARQL and other supported query languages. |
| Inference System | An interface, tool for building and testing inferencing across the data. |
| API & Data endpoint | An application programming interface used to serve integrated data to front-end applications. |
| Microservices Infrastructure | Infrastructure to support microservices for Graph and Relational databases |

Example Application Design Considerations

The components described above comprise the "semantic layer" used for integrating data. Additional applications can be built "on top of" this layer using programmatic connections and data endpoints. Below, are descriptions of some of the possible architectural features used to connect with applications and interfaces.

Microservices Architecture

Figure 6:
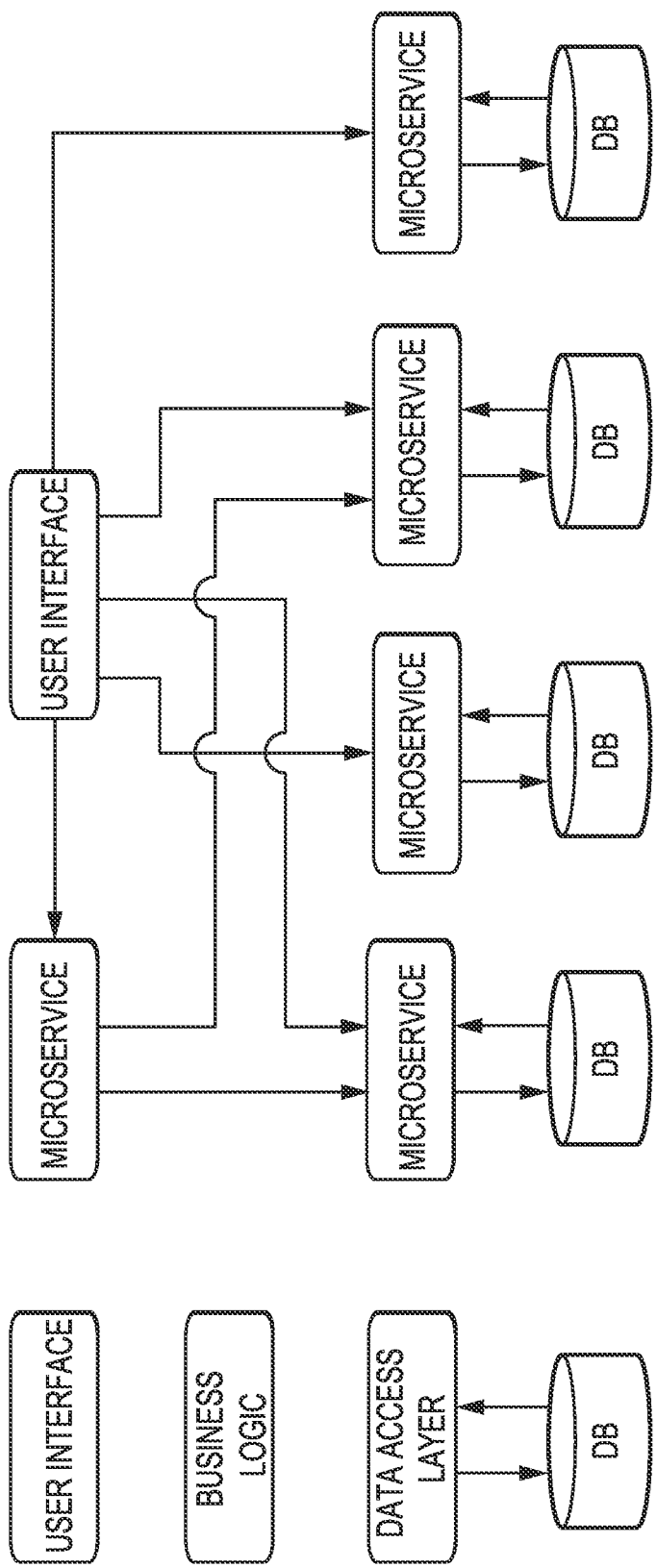
FIG. 6 is a diagram illustrating a microservices architecture that may be used to implement an embodiment of the disclosure. Also shown is a conventional monolithic architecture for comparison.

One possibility is as a single microservice drawn from an integrated data source. This may be appealing because it does not require long term conversion of existing web services. FIG. 6 is a diagram illustrating a microservices architecture that may be used to implement an embodiment of the disclosure. Also shown is a conventional monolithic architecture for comparison.

Application Programming Interface (API)

Communication between the graph database and an application typically uses what's called an application programming interface (API). In addition to using the RDF query language SPARQL. One approach is to use GraphQL, a query language "designed to build client applications by providing an intuitive and flexible syntax and system for describing data requirements and interactions".

There are three characteristics of GraphQL that are of interest for the system described herein:

GraphQL lets the client specify the data required with each request.
GraphQL uses a strongly-typed system to describe the data.
GraphQL makes it easier to aggregate data from multiple sources.

Graph QL and SPARQL both offer a powerful and flexible alternative to REST APIs, the typical API paradigm most developers are familiar with.

Figure 7:
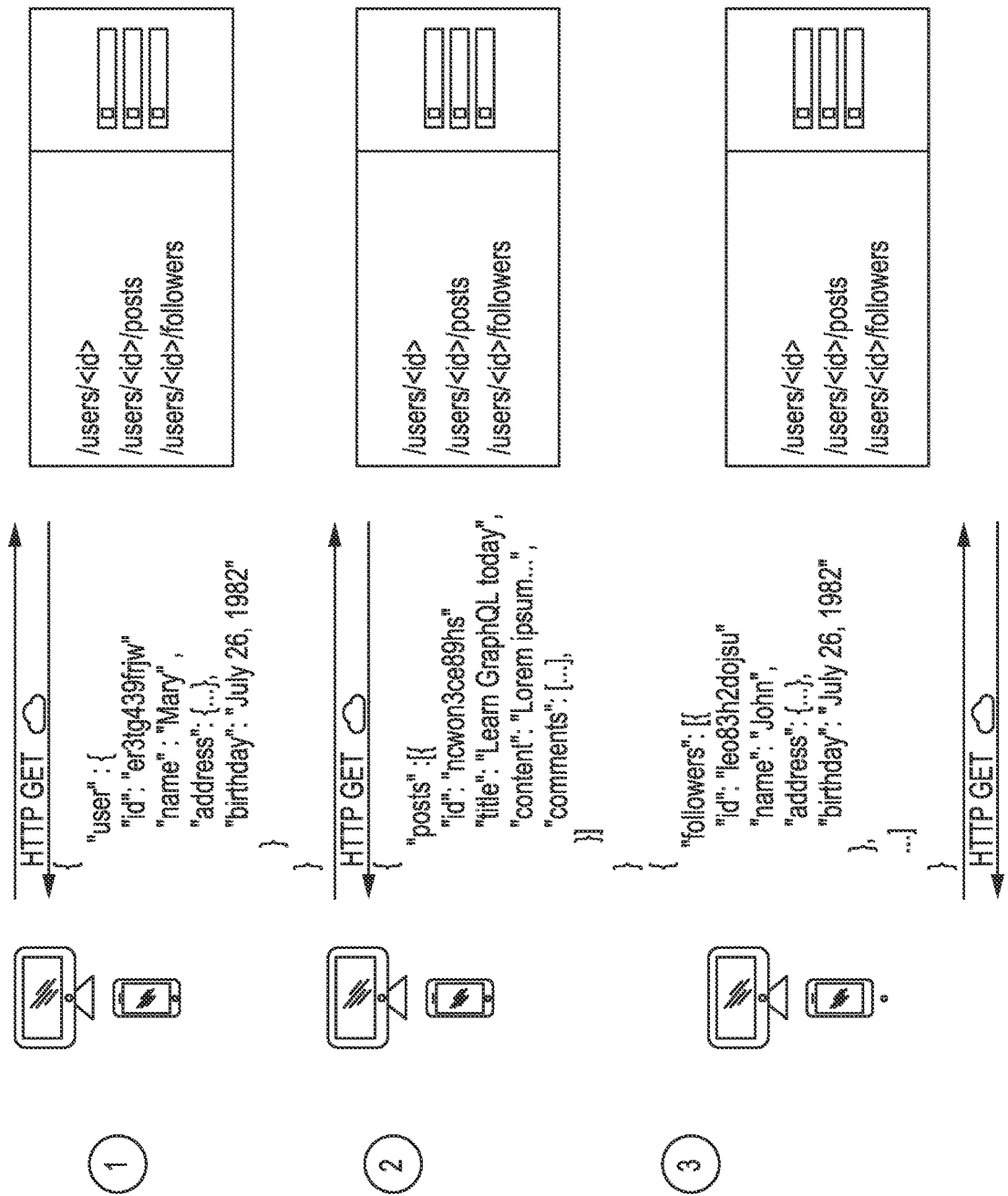
FIG. 7 is a diagram illustrating an example of the structure of a REST API such as might be used in implementing an embodiment of the disclosure.

Problems with REST APIs:

Traditional REST APIs define individual resources as URIs and retrieve those resources with a GET request. FIG. 7 is a diagram illustrating an example of the structure of a REST API such as might be used in implementing an embodiment of the disclosure.

As can be seen in the figure, the client makes a request to an endpoint (/users), and then receives some information (here presented in a JSON format). The format of the information returned is set for this specific endpoint. In REST APIs the structure of the data is tightly coupled with the retrieval method. GraphQL solves this problem by decoupling the retrieval method from the data structure using a schema request.

A GraphQL schema serves as a contract between the client and the server. It defines what data can be retrieved, and what fields that data contains. This gives the client total control on the fields returned. A GraphQL schema might look something like this:

```
type User {
    id: ID
    Name: String
        Posts: [Post]
        Followers:[User]
    }
    type Post {
        id: ID
        Title: String
    }
```

Notice that this schema describes the kind of data that is available but does not give any information on how these objects would be fetched for a client. This is due to the decoupling of the data retrieval from the data formatting. All a client has to do to access data from the GraphQL schema is write a GraphQL Query.

GraphQL Queries

Figure 8:
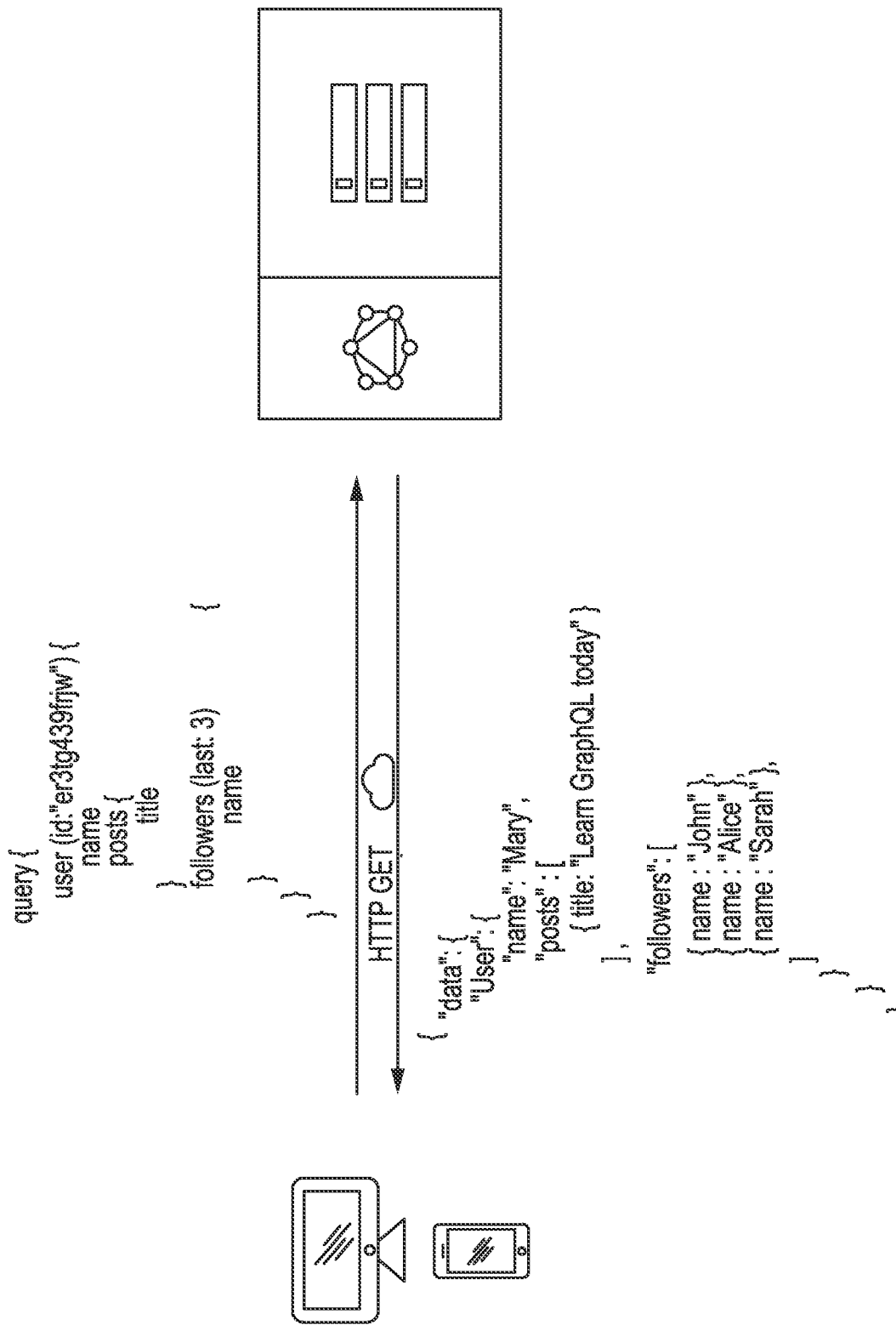
FIG. 8 is a diagram illustrating a GraphQL Query for the schema referenced in the specification.

FIG. 8 is a diagram illustrating a GraphQL Query for the above schema.

As can be seen in the figure, one is able to get all the data wanted in a single query. Although this example is a trivial one for illustration purposes, one can see the capabilities GraphQL provides when we decouple the data definitions from their retrieval methods.

This approach provides several advantages over a RESTful API. These include:

1. Serving Multiple Applications

A database may serve many front-end applications. These applications may well vary greatly in their scope and requirements. Creating individual custom endpoints for each application can be cumbersome. A growing number of endpoints, along with new endpoints for each version, can quickly become an unmanageable mess. With a well-defined GraphQL schema, one can provide a single, flexible endpoint that can be consumed by all of our applications, allowing for a true Micro-Service Architecture.

2. Insightful Backend Analytics

Because data consumers specify each field they use, one can gain a deep understanding on what fields are commonly requested, and evolve our API based on that information.

3. Decoupling Frontend and Backend Development Cycles

The schema that GraphQL defines is a strongly typed system. This means that every type exposed in the API is defined in the schema using the GraphQL Schema Definition Language (SDL). This schema is a contract between a client and the server. Once defined, developers working on front-end microservice applications can develop without needing further communication, since a data contract between the two has already been defined. Frontend applications can easily test the database by mocking the data structures that are predefined by the schema.

4. Simpler Queries

Suppose that a client wants to find a user Sarah and all the friends-of-friends of that user whose job title is Neurologist. With REST, a query might look like this:

GET api.example.com/users/Sarah?include=friend.friend.name&friend.friend.ocupation=Neurologist However, GraphQL makes the query much cleaner:

```
{
    user(name:Sarah){
        friends{
            friends(job: "Neurologist"){
                name
            }
        }
    }
}
```

5. No Over/Under Fetching of Data

Because REST endpoints are predefined resources, a set amount of data is returned for each query. This can result in too much data returned—maybe the client wanted the friends of a user but didn't care about their birthday. This can also result in too little data returned—maybe the client saw that a user's job title was Engineer, but the description of the job was not provided. Now the client needs to make another query to the Engineer endpoint to retrieve that data.

GraphQL alleviates these issues. With a set schema serving as a data contract, a client knows exactly what data structures are available, and can create a query to return all the fields they want, and only the fields they want. This reduces the number of queries and the data returned per query. GraphQL is an extremely flexible and promising concept that can assist in building an agile microservice-style architecture. Some concerns remain regarding the novelty of the protocol, as well as the learning curve for new users who might already be acclimated to REST style APIs. However, GraphQL adoption has been accelerating exponentially since its debut, and the surrounding community has been working hard to create tools and libraries that give it functionality congruent to REST. Additionally, as has been described, GraphQL queries can range from very simple to quite complex, which means that one can have something for everyone ranging from the technically disinclined to power users.

As has been described, embodiments of the system(s) and methods may perform or execute one or more of the following steps, stages, processes, functions or operations:

1. Access an existing Ontology or create one to represent data, with the Ontology being in a known format (e.g. JSON Schema, although not limited to this format);
2. The methods and techniques described are used to generate a new database, with a schema that mirrors the Ontology (see for example, step 308 of FIG. 3(A);
3. The methods and techniques described are used to generate a new GraphQL Schema and GraphQL Resolver code that mirrors the Ontology, and allows for querying into the database created in step (2);
4. Data is ingested into the database created in step (2). The methodology for ingesting data entries into the database is usually specific to the business domain of the user of this application; and
5. Once ingested, the data is the available for query via the GraphQL Server created in step (3). The GraphQL Server queries the database generated in step (2) and returns data to the end user.

The present disclosure includes the following numbered clauses:

Clause 1: A method, comprising:
accessing an Ontology, the Ontology in a format and representing a set of data and a hierarchical relationship between at least some of the set of data;
converting the format of the Ontology into a schema for a database;
based on the database schema, generating a database entry for each of the set of data;
storing the generated database entries in a database;
generating a GraphQL schema from the Ontology;
generating a GraphQL database resolver from the Ontology; and
generating an API for the database from the Ontology.

Clause 2. The method of clause 1, wherein the format of the Ontology is JSON.

Clause 3. The method of clause 1, further comprising:
generating a query for use in searching the database based on the generated GraphQL schema and GraphQL database resolver;
submitting the query to the database using the API; and
receiving a result of executing the query over the database.

Clause 4. The method of clause 1, wherein generating an API for the database further comprises generating an API function signature and API payload.

Clause 5. The method of clause 1, wherein the database is a Graph database.

Clause 6. The method of clause 1, wherein the database is a relational database.

Clause 7. The method of clause 1, wherein converting the format of the Ontology into a schema for a database further comprises converting the format based on a database definition language.

Clause 8. The method of clause 1, further comprising converting the format of the Ontology into a JSON format prior to converting the format of the Ontology into a schema for a database.

Clause 9. A system for creating and accessing a database, comprising:
   at least one electronic processor;
   an electronic non-transitory data storage element including a set of computer-executable instructions that, when executed by the electronic processor, cause the system to
   access an Ontology, the Ontology in a format and representing a set of data and a hierarchical relationship between at least some of the set of data;
   convert the format of the Ontology into a schema for a database;
   based on the database schema, generate a database entry for each of the set of data;
   store the generated database entries in a database;
   generate a GraphQL schema from the Ontology;
   generate a GraphQL database resolver from the Ontology; and
   generate an API for the database from the Ontology.

Clause 10. The system of clause 9, wherein the format of the Ontology is JSON.

Clause 11. The system of clause 9, wherein the computer-executable instructions further comprise instructions for causing the system to:
   generate a query for use in searching the database based on the generated GraphQL schema and GraphQL database resolver;
   submit the query to the database using the API; and
   receive a result of executing the query over the database.

Clause 12. The system of clause 9, wherein generating the API for the database from the Ontology further comprises generating an API function signature and API payload.

Clause 13. The system of clause 9, wherein the database is a Graph database.

Clause 14. The system of clause 9, wherein the database is a relational database.

Clause 15. The system of clause 9, wherein converting the format of the Ontology into a schema for a database further comprises converting the format based on a database definition language.

Clause 16. The system of clause 9, wherein the computer-executable instructions further comprise instructions for causing the system to convert the format of the Ontology into a JSON format prior to converting the format of the Ontology into a schema for a database.

Clause 17. The system of clause 16, further comprising an Ontology generator that operates to generate an Ontology from a set of data.

Clause 18. The system of clause 9, wherein the system accesses one or more Ontologies and operates to generate a plurality of database schemas and APIs from the one or more Ontologies, and further, operates to generate one or more databases formed from data represented by each of the one or more Ontologies, wherein each of the one or more databases includes database entries represented by one of each of the plurality of database schemas.

Clause 19. The system of clause 18, further comprising an API layer able to access each of the generated one or more databases, wherein the API layer includes a plurality of APIs.

Clause 20. The system of clause 19, further comprising one or more applications operating to access the one or more databases using the API layer.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

APPENDIX

The following Appendix contains information that may provide further examples and/or details regarding one or more embodiments of the invention described herein. The entire contents of the Appendix are considered part of the present application and are incorporated herein in its entirety.

Ontology Reader Example

An example of code that may be used to generate an example of an Ontology Reader is presented below:
In one embodiment, the Ontology Reader should be able to parse a JSON-Schema Ontology and create TypeScript types representing a JSON schema;
Below is an example implementation of the Ontology Reader module:

```
/**
 * Interface representing a single entity from Ontology.
 */
export interface IOntologyEntity {
  title: string;
  description: string;
  type: string;
  // List of all parent types.
  parentTypes: string[ ];
  // List of all properties (not those of the parent types).
  properties: IOntologyProperty[] ;
}
/**
 * Interface representing a single property of an entity from an Ontology.
 */
export interface IOntologyProperty {
  name: string
  type: string;
```

```
    isReference: boolean;
    isArray: boolean;
    // Indicates if the property is a reference to a class or a data type.
    isDatatype: boolean;
  }
Import {IOntologyEntity } from
'./IOntologyEntity';
    Import { IOntologyProperty } from './IOntologyProperty';
    /**
     * Class to parse a JSON-Schema ontology and allow access to the entities.
     */
    export class OntologyReader {
      // Collection of entities in the ontology.
      private parsedOntology: {[key: string]: IOntologyEntity};
      /**
       * Creates an instance of the OntologyReader class. Parses an ontology and adds
       * all entities to the dictionary.
       * @param ontology - A JSON-Schema object.
       */
      constructor(ontology: {[key: string]: any}] {
        this.parsedOntology = { };
        for (var entity in ontology) {
          this.parsedOntology[entity] = {
            title: ontology[entity].title,
            description: ontology[entity].description,
            type: ontology[entity].type,
            parentTypes: this.getReferencesForEntity(ontology[entity].allOf),
            properties: this.getPropertiesForEntity(ontology[entity].properties)
          };
        }
      }
      /**
       * Gets a list of all available entities.
       */
      public getEntities( ): string[ ]{
        return Object.keys(this.parsedOntology);
      }
      /**
       * Gets a single entity
       * @param entity · The name of the entity.
       */
      public getEntity(entity: string): IOntologyEntity {
        return this.parsedOntology[entity];
      }
      /**
       * Gets all the properties for an entity, settings the various indicators.
       * @param entityProperties - A JSON schema list of all properties for am entity.
       */
      private getPropertiesForEntity(enityProperties: any) : IOntologyProperty[ ]{
        let retProperties: IOntologyProperty[ ] = [ ];
        for (let property in entityProperties) {
          let isArray: boolean = false;
          let type: string = '';
          let isReference = false;
          let isDataType = false;
          if (entityProperties[property].$ref ! == undefined) {
            isReference = true;
            type = this.parseReference(entityProperties[property].$ref);
          }
          else if (entityProperties[property].type === 'array'){
            isArray =true;
            if (entityProperties[property].items.$ref ! == undefined) {
                    isReference = true;
                    type = this.parseReference(entityProperties[property].items.$ref);
                  }
                  else {
                    type = entityProperties[property].items.type
                  }
                }
                else {
                  type = entityProperties[property].type
                }
                // Need a better way to check this.
                if (type === 'quantitative_value' || type === 'age') {
                  isDataType = true;
                }
                retProperties.push({(
                  isReference: isReference,
                  name: property,
```

```
                type: type,
                isArray: isArray,
                isDatatype: isDataType
            });
        }
        return retProperties;
    }
    /**
     * Parses the references parent types and returns a list of parents.
     * @param entityReferences - THe JSON-Schema entity references.
     */
        private getReferencesForEntity(entityReference: any[ ]): string [ ] {
    let retReferences: string[ ] = [ ];
    if (entityReferences === undefined) {
        return retReferences;
    }
    for (let reference in entityReferences) {
        retReferences.push(this.parseReference(entityReferences[reference].$ref));
    }
    return retReferences;
    }
    /**
     * Parses a JSON-Schema reference and returns the string after the last '/' char.
     * @param referenceStr
     */
    private parseReference(referenceStr: string): string {
        return referenceStr.substring(referenceStr.lastIndexOf('/') + 1);
    }
}
```

That which is claimed is:

1. A method, comprising:
accessing an Ontology, the Ontology in a format and representing a set of data and a hierarchical relationship between at least some of the set of data;
converting the format of the Ontology into a schema for a database;
based on the database schema, generating a database entry for each of the set of data;
storing the generated database entries in a database;
generating a GraphQL schema from the Ontology;
generating a GraphQL database resolver from the Ontology; and
generating an API for the database from the Ontology,
wherein the method further comprises accessing one or more Ontologies and generating a corresponding database schema and API for each of the one or more Ontologies, and further, generating a corresponding database for each of the one or more Ontologies, wherein the corresponding database for an Ontology includes database entries based on the corresponding database schema.

2. The method of claim 1, wherein the format of the Ontology is JSON.

3. The method of claim 1, further comprising:
generating a query for use in searching the database based on the generated GraphQL schema and GraphQL database resolver;
submitting the query to the database using the API; and
receiving a result of executing the query over the database.

4. The method of claim 1, wherein generating an API for the database further comprises generating an API function signature and API payload.

5. The method of claim 1, wherein the database is a Graph database.

6. The method of claim 1, wherein the database is a relational database.

7. The method of claim 1, wherein converting the format of the Ontology into a schema for a database further comprises converting the format based on a database definition language.

8. The method of claim 1, further comprising converting the format of the Ontology into a JSON format prior to converting the format of the Ontology into a schema for a database.

9. A system for creating and accessing a database, comprising:
at least one electronic processor;
an electronic non-transitory data storage element including a set of computer-executable instructions that, when executed by the electronic processor, cause the system to
access an Ontology, the Ontology in a format and representing a set of data and a hierarchical relationship between at least some of the set of data;
convert the format of the Ontology into a schema for a database;
based on the database schema, generate a database entry for each of the set of data;
store the generated database entries in a database;
generate a GraphQL schema from the Ontology;
generate a GraphQL database resolver from the Ontology; and
generate an API for the database from the Ontology;
and wherein the system accesses one or more Ontologies and operates to generate a corresponding database schema and API for each of the one or more Ontologies, and further, operates to generate a corresponding database for each of the one or more Ontologies, wherein the corresponding database for an Ontology includes database entries based on the corresponding database schema.

10. The system of claim 9, wherein the format of the Ontology is JSON.

11. The system of claim 9, wherein the computer-executable instructions further comprise instructions for causing the system to:

generate a query for use in searching the database based on the generated GraphQL schema and GraphQL database resolver;

submit the query to the database using the API; and receive a result of executing the query over the database.

12. The system of claim 9, wherein generating the API for the database from the Ontology further comprises generating an API function signature and API payload.

13. The system of claim 9, wherein the database is a Graph database.

14. The system of claim 9, wherein the database is a relational database.

15. The system of claim 9, wherein converting the format of the Ontology into a schema for a database further comprises converting the format based on a database definition language.

16. The system of claim 9, wherein the computer-executable instructions further comprise instructions for causing the system to convert the format of the Ontology into a JSON format prior to converting the format of the Ontology into a schema for a database.

17. The system of claim 16, further comprising an Ontology generator that operates to generate an Ontology from a set of data.

18. The system of claim 9, further comprising an API layer able to access each of the generated one or more databases, wherein the API layer includes a plurality of APIs.

19. The system of claim 9, further comprising one or more applications operating to access the one or more databases using the API layer.

* * * * *